D. M. BLISS.
ELECTRIC SIGNALING DEVICE.
APPLICATION FILED MAR. 18, 1907.
982,930.
Patented Jan. 31, 1911.
2 SHEETS—SHEET 1.
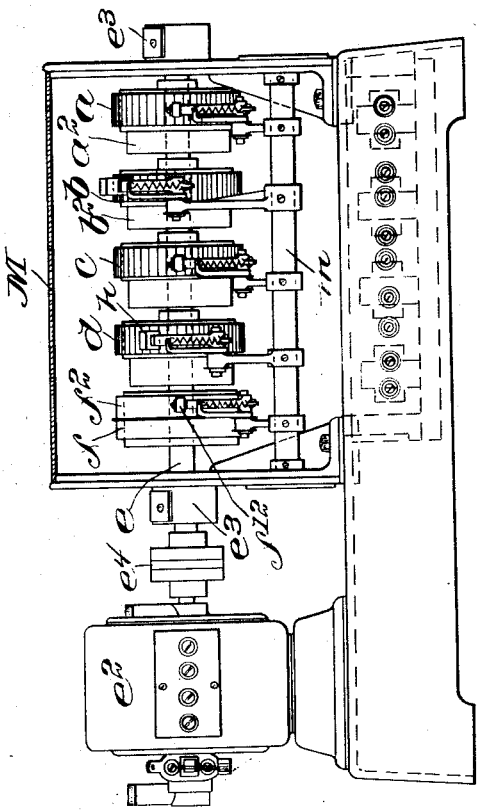
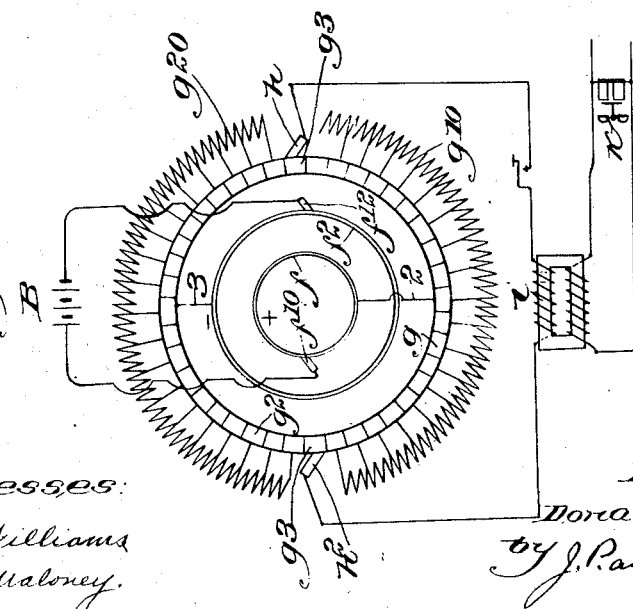
Witnesses:
G. H. Williams
Jas. J. Maloney.
Inventor:
Donald M. Bliss
by J. P. and H. P. Livermore
Attys.

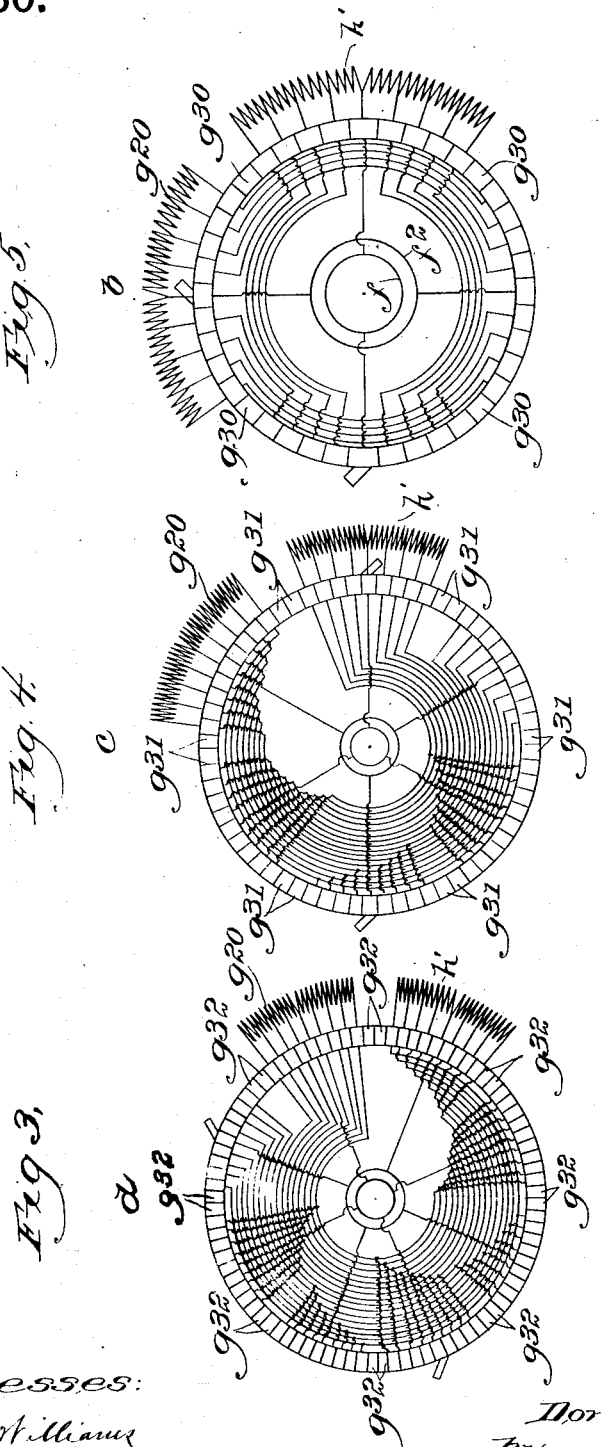

UNITED STATES PATENT OFFICE.

DONALD M. BLISS, OF NEW YORK, N. Y.

ELECTRIC SIGNALING DEVICE.

982,930.  Specification of Letters Patent.  Patented Jan. 31, 1911.

Application filed March 18, 1907. Serial No. 362,808.

*To all whom it may concern:*

Be it known that I, DONALD M. BLISS, a subject of the King of Great Britain, residing in New York, in the county of New York and State of New York, have invented an Improvement in Electric Signaling Devices, of which the following description, in connection with the accompanying drawings, is a specification, like letters on the drawings representing like parts.

The present invention relates to a current converter, and is especially adapted for signaling purposes on telegraph and telephone lines, where signals of the so-called harmonic type are used, *i. e.*, signals on the same line capable of being individually selected and operated by arranging each signal to respond to an alternating current having a predetermined wave frequency.

The converter embodying the invention consists of a traveling switch or commutator, the segments of which are connected together through resistance coils, and divided into sets, so that in the rotation of the commutator the current delivered is reversed in direction and varied in strength. For selective signaling purposes, a series of commutators are used, each having resistances differently arranged, so that each commutator, on receiving direct current, will deliver an alternating current having a wave form differing from that of the others. By this construction a very small amount of power is required to operate the signaling device, since the current is not generated thereby, while any efficiency desired may be obtained by using a source of direct current of the right strength.

A further feature of the invention is embodied in the combination with the converter of a transformer to deliver current to the signaling circuit, so that any desired voltage may be obtained in the said signaling or secondary circuit.

Figure 1 is a side elevation of a signaling device embodying the invention; and Figs. 2, 3, 4 and 5 are diagrams showing the several commutators utilized for delivering the different alternating currents.

The current converter is herein illustrated as embodied in a signaling device for transmitting selective signals, and consists of a series of commutators $a$, $b$, $c$, and $d$ mounted on a shaft $e$ which is common to all, the said shaft being arranged to be rotated continuously at any desired speed, as by an electromotor $c^2$. The segments of each commutator are arranged to receive direct current through collecting rings $f$ and $f^2$, a single pair of rings being sufficient to supply all the commutators with current. These rings receive direct currents through brushes $f^{10}$ and $f^{12}$ from a suitable source of direct current, herein indicated as a battery B.

In the diagram, Fig. 2, which illustrates the commutator $a$, the arrangement is such as to give a simple, alternating current having two waves to a revolution, the same as a current delivered from a bi-polar alternating current generator. For this purpose, the segments are divided into two sets $g$ and $g^2$ separated from each other by dead or disconnected segments $g^3$, the adjacent segments of each set being connected together through resistances $g^{10}$ and $g^{20}$, respectively. One of the segments of set $g$ is connected by means of a conductor 2 with the ring $f$, while one of the segments of set $g^2$ is connected by means of a conductor 3 with the ring $f^2$. In the rotation of the commutator, therefore, as the segments travel past the brushes $h$ and $h^2$, the resistance in the circuit from the brush $h$ and brush $h^2$ will decrease as the conductor 2 approaches the brush $h$, and then increase until the opposite dead segment reaches the said brush. The current, therefore, rises and falls during half a revolution, and then reverses, correspondingly rising and falling during the other half. A current of definite wave form is, therefore, sent out over the circuit closed by the conductor 3, which circuit is shown as containing the primary coil of a transformer $i$, the other coil of which is in the signaling circuit containing, for example, the bell $k$. Assuming, therefore, that the signaling circuit has a plurality of signals each adapted to respond to an alternating current having waves of different frequencies, only one of the said signals will respond to the exclusion of the others. The use of the transformer not only insulates the signaling circuit, but also admits of obtaining any voltage desired for signaling purposes, without varying the main source of current.

The signals are controlled by circuit closers $a^3$, in the primary circuits, so that no current is expended except when a signal is being sent.

Figs. 3, 4 and 5 are diagrams of the windings, respectively, of the commutators $b$, $c$ and $d$, which, in the construction shown, are arranged to send out alternating currents corresponding respectively to currents from 4, 6 and 8 pole alternating current generators; that is, alternating currents of wave form, but differing in frequency. The general construction is the same in each case as that described in connection with Fig. 2, the commutators being divided into four, six and eight parts by dead segments $g^{30}$, $g^{31}$, $g^{32}$, two sets of resistances $h'$, $g^{20}$ being utilized in connection with all the sets of segments by means of cross connections.

As indicated in Fig. 1, the apparatus embodying the invention can be very compactly arranged, all the commutators being comparatively close together on the shaft $e$, and the resistance coils contained in casings $a^2$, $b^2$, etc., mounted on the shaft adjacent to the commutators.

The current is supplied to all the commutators through the two collector rings $f$ and $f^2$, and the brushes $f^{10}$ and $f^{12}$, as well as the several sets of brushes $h$ and $h^2$ for the commutators, or mounted on brackets supported on an arm or rod $m$ within the casing M which contains the entire apparatus, with the exception of the motor.

By inclosing the resistance coils in the casings $a^2$, $b^2$, etc., connected directly with the commutators, each converter becomes a separate unit, which may be readily detached from the shaft $e$ and replaced by another.

The shaft $e$ is supported in bearings $e^3$ in the end members of the frame or casing, which end members also afford the support for the rod $m$ upon which the several brushes are mounted. The said shaft also has a coupling $e^4$ whereby the motor $e^2$ may be directly connected therewith, thus making a very compact construction, and, at the same time, one in which the converting units are readily interchangeable for adaptation to different signaling systems.

Claim.

In a current converter for signaling purposes, a plurality of commutators each having separate sets of adjacent segments, the sets of segments being separated, and adjacent segments of each set being insulated from each other, but connected through resistance coils; a casing connected with each commutator to contain the resistance element, each commutator and its resistance thus constituting a complete unit; a driving shaft common to all of said commutators; collector rings connected with the positive and negative poles of a source of current, said collector rings being common to all the commutators; conductors leading from said rings to the middle segments of adjacent sets on each commutator; brushes to transmit current from the several commutators; and a transformer in each external circuit supplied from said commutators.

In testimony whereof, I have signed my name to this specification in the presence of two subscribing witnesses.

DONALD M. BLISS.

Witnesses:
J. J. ESTABROOK,
FRANK S. GANNON, Jr.